Aug. 17, 1937.  L. CONTRATTO  2,090,344
TRACTOR
Original Filed May 25, 1934
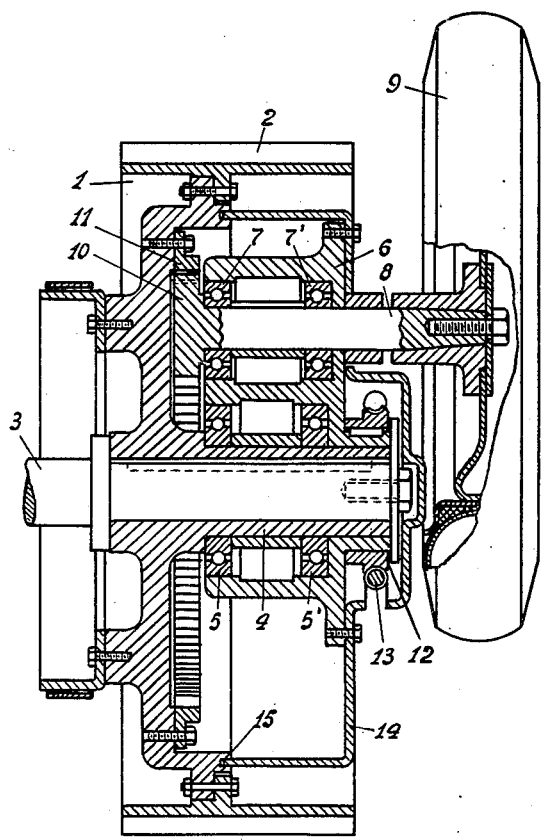
Inventor,
Laurenz Contratto
by Jno. Imirie
Att'y Patented Aug. 17, 1937

2,090,344

UNITED STATES PATENT OFFICE 2,090,344

TRACTOR

Laurenz Contratto, Sisikon, Switzerland

Original application May 25, 1934, Serial No. 727,487. Divided and this application February 26, 1935, Serial No. 8,327. Renewed July 13, 1937. In Germany May 27, 1933

2 Claims. (Cl. 180—15)

My present invention relates to tractors and is divided from application Serial No. 727,487 filed 25th May 1934.

The invention relates more especially to improvements in tractors of the change wheel type viz., having two pairs of traction wheels, which can be alternatively used: One pair of relatively large diameter having wide rims and cleats attached thereon, hereinafter briefly called farming wheels, and being designed to travel on soft soil as in ploughing, ditching etc., and another pair of smaller wheels, designed to carry the tractor over hard roads as in hauling and the transportation of goods.

The primary object of this invention is to provide an improved change wheel structure for tractors, so designed that the farming wheels can be speedily thrown out of operation and exchanged by the driver of the tractor for the road wheels, without the aid of tools such as wrenches, tongues of special design etc., and in much shorter periods of time than with tractor designs used heretofore.

In connection therewith the invention aims at providing a change wheel structure of improved design for tractors, in which the farming wheels are structurally so associated with the road wheels, that the latter can be lifted to a relatively great hight above the ground, and so that the tractor can be freely driven over deeply ploughed ground and also over extraordinarily soft soils including peat, marshland etc., into which the tractor may sink to a considerable depth, without incurring the risk of the road wheels coming into contact with clods or other obstructions.

Another object of the invention will become incidentally apparent hereinafter to practitioners in this art.

The nature and scope of the invention are briefly outlined in the appended claims and will be more thoroughly understood by the following specification taken together with the accompanying drawing which shows a section taken vertically through a change wheel structure for tractors designed according to this invention and shown by way of an example.

The change wheel structure for tractors designed according to this invention essentially comprises a rotary shaft 3 representing one of the rear axles of the tractor and being called hereinafter primary driving shaft, a wheel 1, hereinafter called farming wheel, which is adapted as to the width of its rim to travel on soft ground and is preferably provided with cleats 2; the tubular hub 4 of said farming wheel is keyed to the primary shaft 3; a hollow member 6, hereinafter called gear box, which is rotatably mounted preferably by means of ball bearings 5, 5' on the hub 4 of the farming wheel 1 in excentric position to the latter and is adapted to be swung around the said hub, so as to change its angular position relatively to the farming wheel 1; self locking means under the driver's control for swinging said gear box 6 around the hub 4 of the farming wheel.

As shown in the drawing said self locking means comprise a worm gear 12, 13, the spindle 13 of which being preferably so long as to be in reach from the driver's seat and having a hand wheel (not shown) attached.

Another rotary shaft 8, hereinafter called secondary shaft is journalled on ball bearings 7, 7' in the gear box 6 so as to extend substantially parallel to the primary shaft 3. A traction wheel 9, herein called road wheel, is secured to the said secondary driven shaft 8 and bears a pneumatic tire. The said primary and secondary shafts are interconnected by a toothed gear comprising a spur wheel 11 having internal teeth and being secured to the spokes of the farming wheel concentrically thereto, and a pinion 10 attached to the secondary shaft 8 meshing with the spur wheel 11. According to this invention the ratio of gearing is so chosen, that the road wheel 9 while on duty will attain a considerably greater speed than the farming wheel 1. The road wheel 9 is lowered to the ground so as to carry the tractor by swinging the gear box 6 around an angle of about 180° on operating on the self locking means 12, 13.

A hood in the form of a cylindrical drum 14, which projects at 15 into an annular groove in the body of the farming wheel 1 encloses the gear box 6 and worm gear 12, 13 for safe-guarding the change wheel mechanism including the worm gear against being accidentally clogged by earth.

Many other changes and modifications may conveniently be made in the structural details of the change wheel attachment for tractors, as described, without substantially departing from the spirit and the salient features of this invention.

What I claim is:

1. A change wheel structure for tractors and the like, including a tractor frame, a farming wheel carried thereby and including a hub, a gear box eccentrically mounted on the hub, means for adjusting the gear box relative to the hub and holding it in adjusted position, a secondary shaft mounted in the gear box in parallelism to and beyond the hub of the farming wheel, a road wheel carried by the secondary shaft beyond the vertical plane of the farming wheel, an annular gear rack carried by the frame of the tractor concentric with the hub of the farming wheel, and a gear carried by the secondary shaft and in constant mesh with the annular gear rack, the eccentricity of the gear box permitting the road wheel to be bodily moved to an operative position in a plane below the ground engaging plane of the farming wheel or to an inoperative position above the ground engaging plane of the farming wheel, the operative position of the road wheel raising the farming wheel free of ground contact.

2. A construction as defined in claim 1, wherein the gear box and driving means for the road wheel are housed within the axial length of the farming wheel and wherein a closure protects the gear box and driving means against external influences.

LAURENZ CONTRATTO.